Jan. 2, 1934.  A. MOORHOUSE  1,942,182
MOTOR VEHICLE
Original Filed Nov. 28, 1927  2 Sheets-Sheet 1
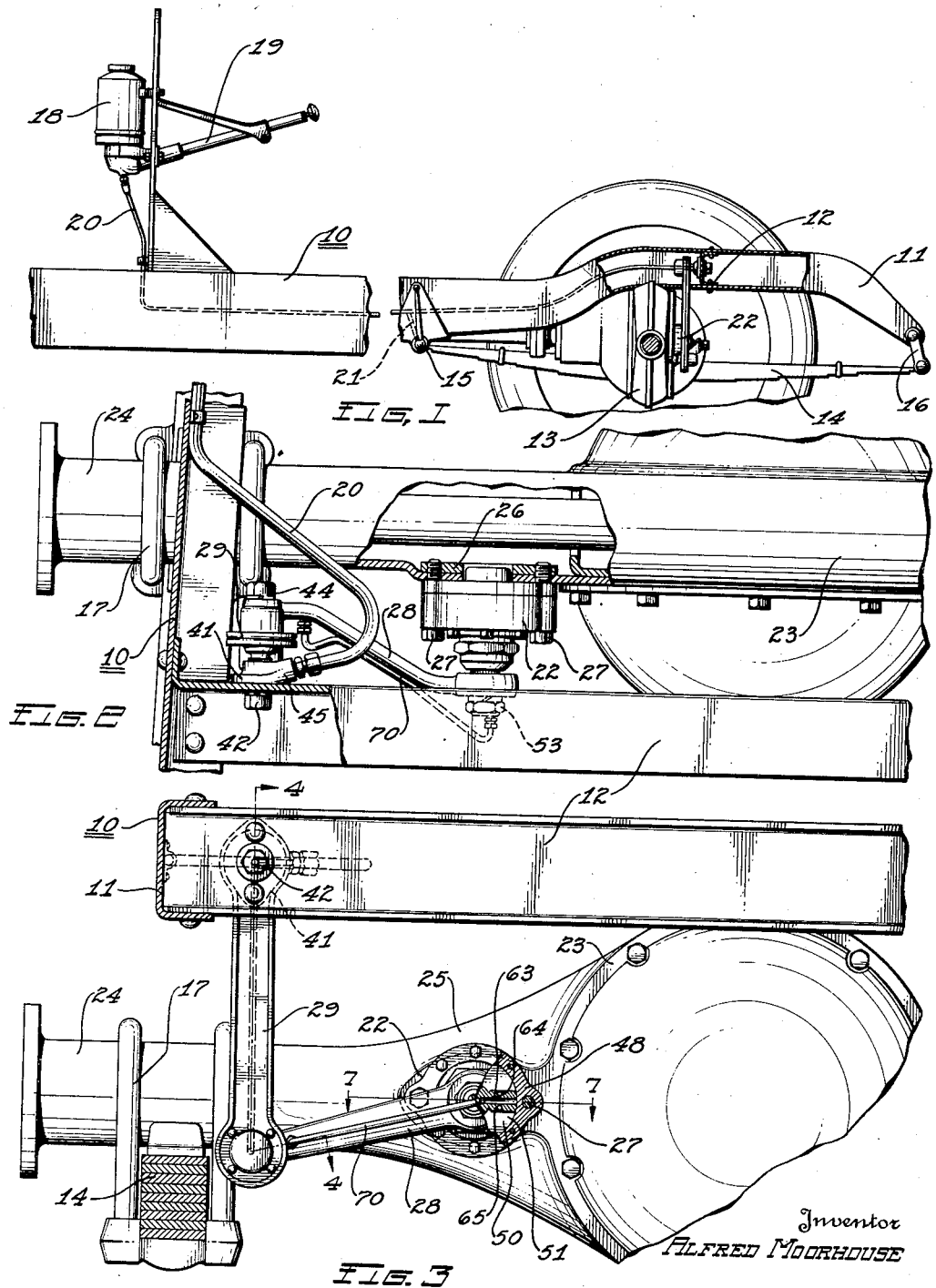
Inventor
Alfred Moorhouse
By Miller-Sibbitts
Attorney Jan. 2, 1934.    A. MOORHOUSE    1,942,182
MOTOR VEHICLE
Original Filed Nov. 28, 1927    2 Sheets-Sheet 2
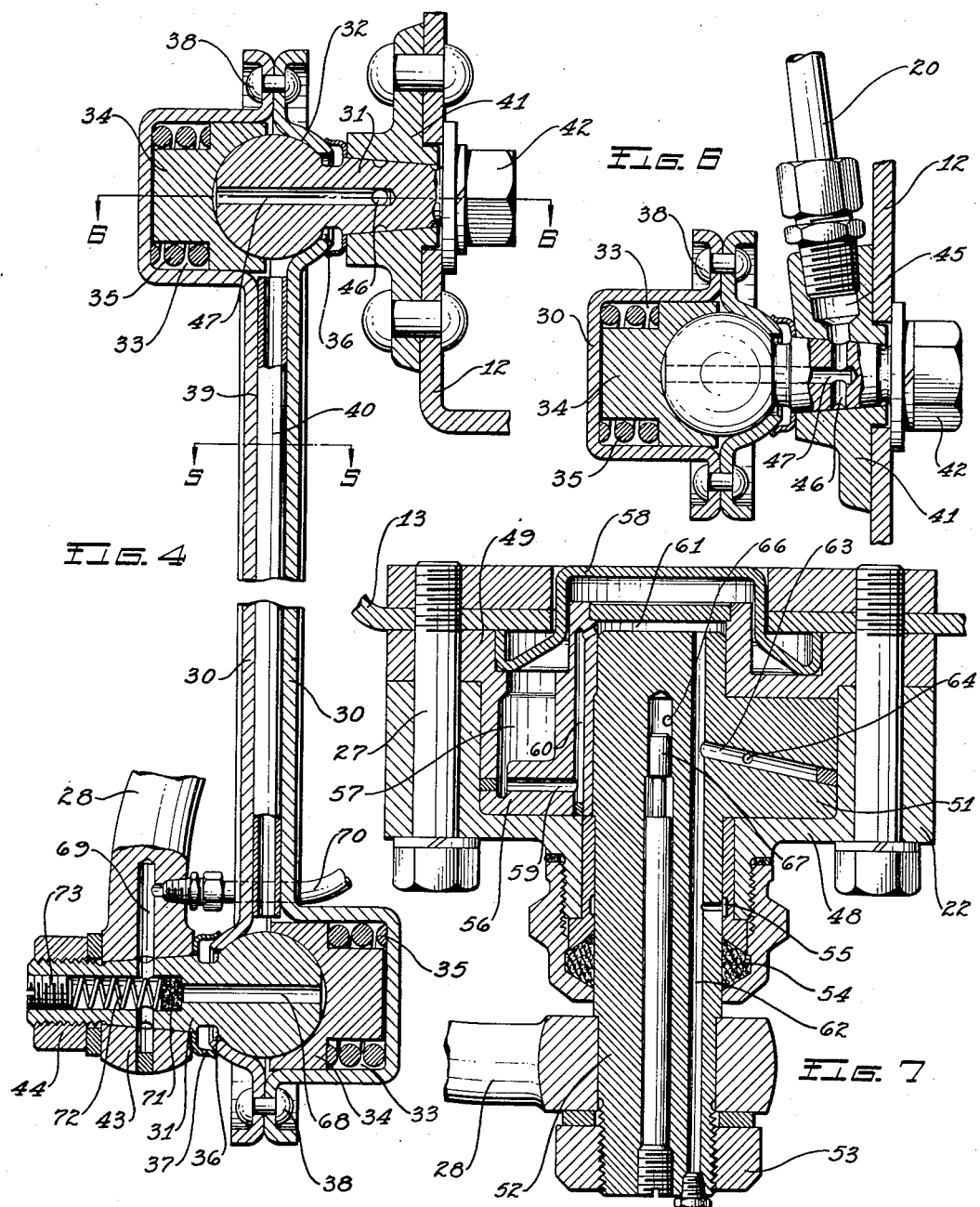
Inventor
ALFRED MOORHOUSE.
By Miller Tibbetts
Attorney Patented Jan. 2, 1934

1,942,182

UNITED STATES PATENT OFFICE 1,942,182

MOTOR VEHICLE

Alfred Moorhouse, Detroit, Mich., assignor to Packard Motor Car Company, Detroit, Mich., a corporation of Michigan Original application November 28, 1927, Serial No. 236,047. Divided and this application January 30, 1929. Serial No. 336,145

4 Claims. (Cl. 74—17)

This invention relates to motor vehicles and more particularly to shock absorbing means and connections therefor and their mountings on the vehicle, the present invention being a division of my pending application for Letters Patent Serial No. 236,047, filed November 28, 1927, entitled Motor vehicles.

An object of the invention is to provide a shock absorber connecting rod which is formed of two similar pieces.

Another object of the invention is to provide a connecting rod which is formed of a pair of members having their end portions formed and arranged to receive bearing members when secured together.

A further object of the invention is to provide a connecting rod which can be cheaply fabricated.

Other objects of the invention will appear from the following description taken in connection with the drawings, which form a part of this specification, and in which:

Fig. 1 is a side elevation, partly in section, of the rear portion of a motor vehicle embodying the invention;

Fig. 2 is a somewhat enlarged plan view of parts of the axle and frame, with portions thereof broken away to show the mounting of the shock absorber and lubricating means;

Fig. 3 is an elevation of the axle and frame parts shown in Fig. 2, with a portion of the shock absorber broken away to disclose its interior construction;

Fig. 4 is an enlarged view in section, substantially on the line 4—4 of Fig. 3;

Fig. 5 is a cross section through the connecting rod on the line 5—5 of Fig. 4;

Fig. 6 is a section through one of the joints of the connecting rod and its connection, on the line 6—6 of Fig. 4, and Fig. 7 is an enlarged sectional view through the shock absorber, substantially on the line 7—7 of Fig. 3.

Referring to the drawings, 10 is the vehicle frame having side members 11 and a cross member 12, and 13 is the rear or driving axle of the vehicle upon which the frame is supported through springs 14. The front end of each spring is pivoted to the frame at 15 and the rear end is shackled to the frame at 16. Intermediate its ends the spring is secured to the axle as by the U-bolts 17, shown in Figs. 2 and 3.

A chassis lubricator 18 is suitably mounted on the frame and it has a hand pump 19 by which oil or other lubricant is forced from the lubricator or supply tank through a pipe 20 to the various spring bearings and other parts of the vehicle. One of these connections is shown at 21 where the pivot 15 is lubricated. It is desirable that the piping 20 shall be kept on the frame itself because of the difficulties encountered in carrying it from the frame to the axles.

For controlling or modifying the action of the springs 14 a shock absorber 22 is provided. It will be understood that there are usually four of these shock absorbers, two for each of the axles, but one only is illustrated in the drawings. This shock absorber 22 is mounted on the axle with a strong and rigid connection so that it will not bind or weave and will stand the hard usage to which it is subjected. The axle itself comprises an enlarged middle portion 23, tubular end portions 24 and an intermediate tapered portion 25. The shock absorber 22 is mounted upon this intermediate portion and the pressed steel axle at this point is re-enforced by a backing plate 26, shown particularly in Fig. 2. The shock absorber rests against the axle and is secured thereto by bolts 27 extending through the axle and into the backing plate 26.

The operating arm 28 of the shock absorber extends outwardly towards the end of the axle and is connected to the frame by a connecting rod 29 of novel and unusually strong construction. This connecting rod and its joints are made up as a unit which is connected to and may be disconnected from the frame and shock absorber arm by its ball members.

The connecting rod, as shown herein, comprises two identical stampings 30, the body portions of which are of substantially channel section and the ends of which are formed to surround the ball brackets 31. Each stamped member has a spherical seat 32 at one end and a cylindrical recess 33 at the other, the recess of one member being arranged opposite the seat of the other. In each of these recesses is a bearing member or follower 34 with a spring 35 behind it pressing it towards seat 32, and the ball part of the ball bracket 31 is arranged between this bearing member and the seat, as will be readily seen in Figs. 4 and 6. There is an opening 36 in each of the seats 32 and the shanks of the ball brackets 31 extend through these openings. A dust excluding member 37 surrounds the shank of the ball member to keep the joint clean. The stamped members 30 are secured together as by rivets 38 and this riveting is done after the ball members are in place between the stamped members.

The body portion of the connecting rod is formed with a longitudinal channel 39 between the stamped parts, and a tube 40 is placed in this channel before the parts are riveted together. This tube forms a conduit for lubricant from the upper to the lower joint.

The upper ball member 31 is mounted upon or connected to the frame, and in the present instance it is connected to the cross member 12. On the frame is riveted a small bracket 41 having an opening through which the shank of the ball member 31 passes and the ball member is secured in the bracket 41 by a nut 42. The lower ball member 31 is secured in the arm 28 of the shock absorber in a similar manner, the shank of the ball member passing through the eye 43 in the end of the arm 28 and being secured therein by a nut 44.

Since the shock absorber is mounted on the axle and the connecting rod extends downwardly from its joint with the frame to a joint with the shock absorber arm, lubricant for both joints may be fed from the chassis frame, and this is done by connecting the pipe 20 with an opening in the bracket 41, as shown at 45, Figs. 2 and 6. The ball member 31 is drilled out as shown at 46 and 47 so that the lubricant under pressure from the pipe 20 will pass through the ball member to the spherical surface thereof which is surrounded by the seat 32 and the bearing member 34. Excess lubricant will pass downwardly through the conduit 40 to the lower ball member and thereby lubricate the lower joint also. Thus, each time the pump 19 is operated to lubricate the various chassis bearings, some oil from the piping 20 will be carried to the upper and then the lower joint of the shock absorber connecting rod and keep these joints constantly in good working condition.

The shock absorber shown herein is of the hydraulic type comprising a casing 48 and a cover 49 which form an oil compartment 50 between them. A suitable abutment is provided and a piston 51 operates in the compartment 50 by means of its shaft 52 which extends through the casing 48 and has the arm 28 secured to its outer end as by the nut 53. Suitable packing 54 is provided around the shaft 52 and a leakage groove 55 is formed just inside the packing so that leakage oil will be drawn back into the shock absorber casing, as will hereinafter appear.

The abutment above referred to is formed by an extension 56 on the cover 49, and this extension is cored out to form an auxiliary chamber 57, a cover for which is provided at 58. A conduit marked 59, 60, and 61 extends to a long conduit 62 in the shaft 52 so that oil may be supplied from the auxiliary chamber 57 in case of leakage from the shock absorber. Connecting with the conduit 62 is a passage 63 in the piston 51, and cross passages 64 from the passage 63 connect with the compartment 50 on both sides of the piston through check valves 65 that open towards the compartment.

With the above construction there is a constant suction on the conduit 62 as long as the shock absorber compartment or chamber 50 is not entirely filled with liquid, and this is because one of the check valves 65 will always be open on the low pressure side of the piston, that is, on the side of the piston which is retreating in the operation of the shock absorber. This suction in the conduit 62 tends to draw back into the shock absorber any oil that may escape into the leakage groove 55. It also tends to draw in additional liquid from the chamber 57 in case some oil leaks out of the shock absorber.

The shock absorber is also provided with a bypass 66 controlled by a plug 67 which is just enough smaller than the opening in which it is mounted to permit the desired amount of oil to pass from one side of the piston to the other.

Additional means for feeding oil to the shock absorber are provided in a connection from the chassis lubricator to the conduit 62 of the shock absorber. This is done through a passage 68 in the lower ball member 31, the passage 69 in the arm 28, and a pipe 70 connecting the passage 69 with the conduit 62, this pipe 70 extending lengthwise of the arm 28, as shown particularly in Figs. 2 and 3. A filter, preferably in the form of a felt washer 71 is provided in the ball member 31, as shown in Fig. 4, this filter being held in position by a spring 72 and a plug 73. Thus the oil fed to the lower joint will pass through the filter 71 and through the pipe 70 to the conduit 62, thus securing a supply of clean oil to the shock absorber at all times.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. A connecting rod comprising two identical stampings each formed of a body portion, a spherical seat portion at one end of the body portion and a depressed portion forming a recess, all three of said portions being integral, said stampings being arranged with the seat portion of each stamping opposite the recess of the other, a spring pressed bearing member in each of the recesses, and means for securing the stampings together.

2. A connecting rod comprising two identical stampings each formed of a body portion, a spherical seat portion at one end of the body portion and a depressed portion forming a recess, said seat and depressed portions being of different configuration, all three of said portions being integral, said stampings being arranged with the seat portion of each stamping opposite the recess of the other to accommodate bearing members, and means for securing the stampings together.

3. A connecting rod comprising two identical stampings each formed of a body portion, a spherical seat portion at one end of the body portion and a depressed portion at the other end of the body portion forming a recess, said seat and depressed portions being of different configuration, all three of said portions being integral with the recess and the seat extending from the same side of the stamping, said stampings being arranged with the seat portion of each stamping opposite and facing the recess of the other to accommodate bearing members, and means for securing said stampings together.

4. A shock absorber connection comprising a pair of ball members and a link connecting said ball members comprising two identical stampings each formed of a body portion, a spherical seat portion at one end of the body portion and a depressed portion forming a recess at the other end of the body portion, all three of said portions being integral, said stampings being arranged with the seat portion of each stamping opposite the recess of the other and with the seat portion of each enclosing a substantial portion of one of the ball members, a spring pressed bearing member in each of the recesses engaging the ball members and urging them against the seat portions, and means for securing the stampings together.

ALFRED MOORHOUSE.